(12) United States Patent
Wild et al.

(10) Patent No.: US 6,615,812 B2
(45) Date of Patent: Sep. 9, 2003

(54) METHOD AND ARRANGEMENT FOR OPERATING AN INTERNAL COMBUSTION ENGINE

(75) Inventors: Ernst Wild, Oberriexingen (DE); Lutz Reuschenbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/929,050

(22) Filed: Aug. 15, 2001

(65) Prior Publication Data

US 2002/0029623 A1 Mar. 14, 2002

(30) Foreign Application Priority Data

Aug. 16, 2000 (DE) .......................... 100 39 785

(51) Int. Cl.[7] .................. F02D 43/04; F02D 41/30; F02M 25/07
(52) U.S. Cl. ................. 123/683; 123/684; 123/691; 123/480; 123/568.21
(58) Field of Search ................. 123/478, 480, 123/568.11, 568.21, 679, 681, 683, 684, 691, 692, 445, 462, 463

(56) References Cited

U.S. PATENT DOCUMENTS 6,109,249 A * 8/2000 Wild et al. ............. 123/568.21
6,422,202 B1 * 7/2002 Wild ........................ 123/399

FOREIGN PATENT DOCUMENTS

DE 19753873 A1 * 7/1999

* cited by examiner

Primary Examiner—Tony M. Argenbright
Assistant Examiner—Arnold Castro
(74) Attorney, Agent, or Firm—Walter Ottesen

(57) ABSTRACT

The invention relates to a method and an arrangement for operating an internal combustion engine wherein at least one control quantity of the engine is influenced in dependence upon a signal representing the fresh air charge. The throttle flap angle and the intake manifold pressure are determined and a respective signal is formed on the basis of the throttle flap angle and on the basis of the intake manifold pressure. The charge signal, which is formed on the basis of the throttle flap angle, is adapted to the signal, which is formed on the basis of the intake manifold pressure sensor, with the aid of at least one corrective factor.

11 Claims, 4 Drawing Sheets

METHOD AND ARRANGEMENT FOR OPERATING AN INTERNAL COMBUSTION ENGINE

FIELD OF THE INVENTION

The invention relates to a method and an arrangement for operating an internal combustion engine and especially an engine having gasoline direct injection.

BACKGROUND OF THE INVENTION

The demands imposed on a modern internal combustion engine with respect to a reduction of the fuel consumption and a reduction of the discharged toxic substances become ever greater. The electronic control of the internal combustion engine must operate with ever greater accuracy to satisfy these requirements. This applies especially to the control of the following: the fuel mass to be injected, the ignition angle to be adjusted and/or the air charge to be metered. Especially the quantity, which represents the load of the engine, must be accurately determined because this quantity is applied to compute the control quantities. The most suitable quantity to represent the load is the air charge, especially the relative air charge of the cylinders per stroke. This quantity is a quantity, which is proportional to he fresh air, and a very high accuracy of the engine control can be achieved when using this quantity to determine the control quantities. The air charge is computed in the most accurate way possible from the available quantities. This is described, for example, in U.S. Pat. No. 6,422,202 for an air-mass controlled control system.

This U.S. Pat. No. 6,422,202 is incorporated herein by reference and presents a procedure for computing the relative air charge rl which is determined in accordance with an intake manifold model from a signal of an air-mass sensor. Furthermore, the computation of the air charge signal from the throttle flap position is shown in this patent application as an alternative. Here, intake manifold pressure signals and ambient pressure signals as well as various corrective factors are used. With the aid of these signals, the air mass signal or air charge signal, which is computed on the basis of the throttle flap angle, is adapted to the signal which was determined on the basis of the measuring signal of the air mass sensor and which is per se more accurate.

The driver or other control units, such as a transmission control unit, present a specific torque request to the engine control. The torque request is converted into a desired air charge in the combustion chamber. From this, the charge control computes a desired value for the throttle flap position which is adjusted by means of a position controller. Characteristic quantities of the throttle flap system are used in the computation of the throttle flap desired value. The intake manifold pressure sensor or the air mass sensor measures an actual charge which deviates from the desired charge when the actual characteristic quantities deviate from the quantities stored in the control unit. The requested torque is not set. In the adaptation, the charge, which is computed on the basis of the throttle flap angle and rpm, is compared to the charge computed on the basis of the air mass sensor signal. Then there are deviations, the adaptation changes the characteristic quantities of the throttle flap system so long until the two charges are coincident. These changed characteristic quantities of the throttle flap system are considered in the control of the charge. With the changed characteristic quantities, a changed throttle flap position desired value results to the same torque command and the same desired charge. With this other throttle flap desired value, a charge adjusts, which is measured by the air mass sensor and which is coincident with the desired value. The requested torque is adjusted. The same applies to the EGR system. Here too, the desired EGR desired rates are only reached with calibrated characteristic quantities of the system.

A procedure is disclosed in German patent publication 197 53 873 in accordance with which, and without use or an air mass sensor, the relative air charge for controlling the engine is determined on the basis of the measured intake manifold pressure while considering the internal and external exhaust-gas recirculation.

With respect to an exhaust-gas recirculation system, international patent application PCT/DE 01/00200, filed Jan. 18, 2001, is incorporated herein by reference and discloses a procedure for determining the partial pressure of an external exhaust-gas recirculation. The partial pressure determined in this manner is evaluated to determine an intake manifold pressure value. The model used here is adapted to the actually measured intake manifold pressure. An increase and/or an offset of a characteristic line, which defines the air mass flow through the exhaust-gas valve in dependence upon the position thereof, is corrected so that the measured intake manifold pressure and the model intake manifold pressure, which is formed on the basis of the partial pressures, are coincident.

SUMMARY OF THE INVENTION

An optimal accuracy of the computation of the air charge in the combustion chamber is therefore achieved with systems wherein an air mass sensor, an intake manifold pressure sensor and a throttle flap angle sensor are used for load detection. This permits to adapt the determination of the air charge or air sass flow on the basis of the throttle flap angle (which is inaccurate) to the charge quantity or mass flow quantity, which is determined on the basis of the air mass sensor, by means or corrective factors and to control the charge with the accuracy of the air mass sensor signal. The charge quantity or mass flow quantity is determined on the basis of the air mass sensor. In addition, the use of both signals improves the adaptation and determination of the external exhaust-gas recirculation rate (residual gas charge) whose computational determination can likewise be burdened with inaccuracies.

However, if the air mass sensor is not used, for examples because of reasons of cost or in the case of a fault and, in lieu thereof, an intake manifold pressure sensor is utilized as the main charge sensor, then the adaptation of the throttle flap system and/or the exhaust-gas recirculation system to the main charge sensor should be achieved to thereby maintain the accuracy of the load detection.

With the adaptation of a charge detection, which is based on the throttle flap position, to the accuracy of a charge detection based on the intake manifold pressure sensor, it is possible, notwithstanding the omission of the air mass sensor, to make available a charge detection satisfying the accuracy requirements. Notwithstanding the omission of the air mass sensor, the possibility of an adaptation is thereby retained.

It is especially advantageous that an adaptation is also possible for the adaptation of the exhaust-gas recirculation system.

It is especially advantageous that the adaptation result can be evaluated for monitoring the exhaust-gas recirculation system.

By adapting the charge detection, which is based on the throttle flap angle, to the charge detection, which is based on the intake manifold pressure sensor, a precise control of the engine is made possible and the throttle flap and/or the exhaust-gas recirculation valve is so driven that the desired air charge and/or the desired residual gas charge coincides with the actual air charge, which is computed via the intake manifold pressure sensor, and/or the actual residual gas charge.

An improvement of the accuracy of the adaptation is achieved by utilizing an ambient pressure sensor. However, this sensor can be omitted when the tolerance, which is expanded thereby, is adequate for the accuracy of the engine control.

In an advantageous manner, an improvement of the accuracy of the charge detection is achieved when the adaptation of the charge, which is based on the throttle flap angle, to the charge, which is based on the intake manifold pressure, takes place only under specific peripheral conditions especially when the exhaust-gas recirculation valve is closed, that is, a possibly present exhaust-gas recirculation is inactive.

If the ambient pressure sensor is not used, then the multiplicative adaptation factor defines, for an inactive exhaust-gas recirculation, a quantity which represents the ambient pressure and which is evaluated when detecting the charge and/or for the control of the engine.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
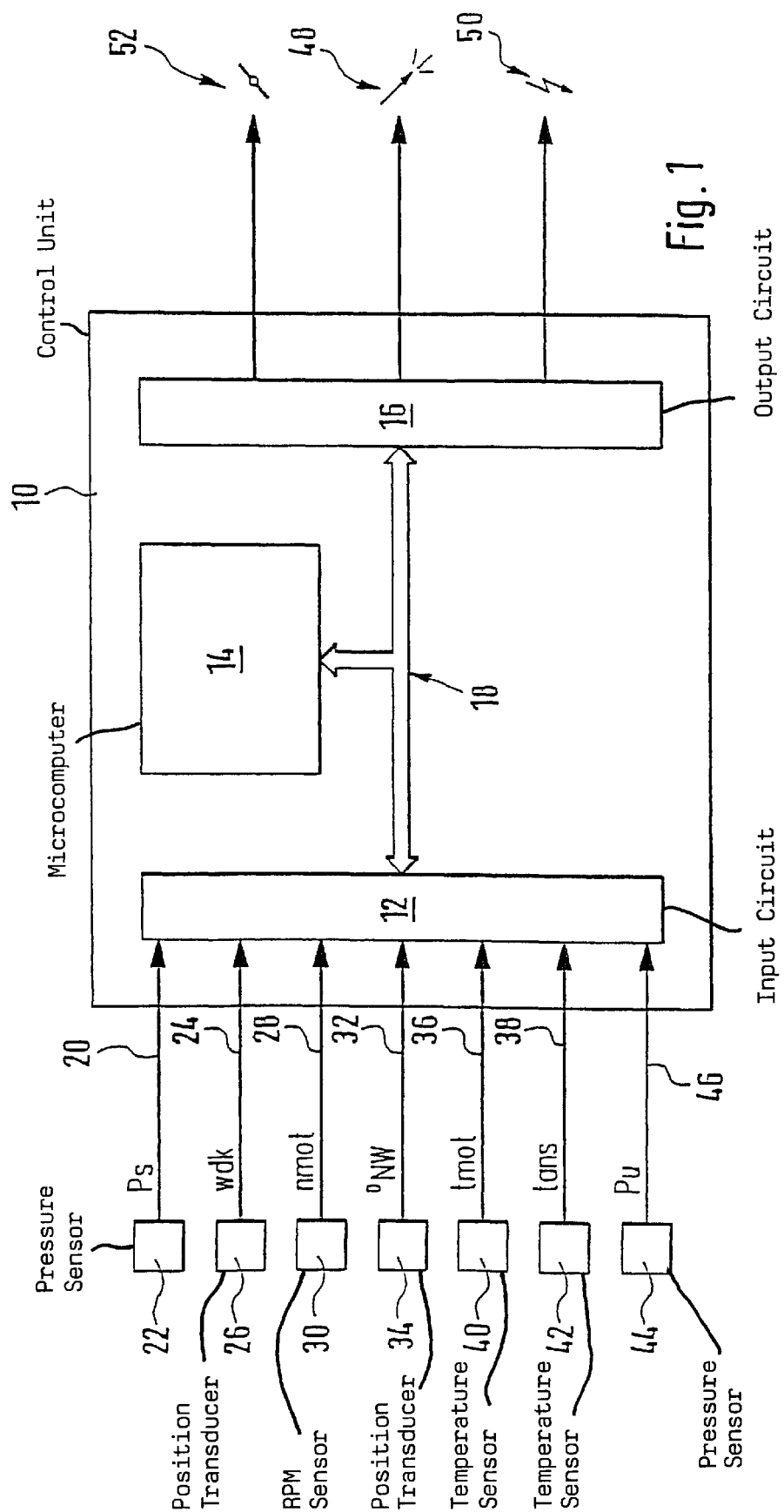
FIG. 1 is a block diagram showing a control system for an internal combustion engine; and, FIGS. 2 to 4 show flowcharts which show preferred embodiments for a throttle flap angle based charge detection and its adaptation to an intake manifold pressure based charge detection as well as the corresponding procedure in combination with the partial pressure determination for an external exhaust-gas recirculation. The flowcharts represent programs of the at least one computer of the control unit for controlling the engine wherein the procedure, which is represented by the flowchart, can be run as programs for charge and/or partial pressure determination.

FIG. 1 shows a control system for an internal combustion engine which includes at least a control unit 10 which has at least an input circuit 12, at least one microcomputer 14 and at least one output circuit 16. These elements are connected to each other via a communication system 18 for mutual data exchange. Various input lines lead to the input circuit 12 via which the measurement signals are transmitted. These measurement signals are provided by corresponding measurement devices and represent operating variables or serve to determine operating variables of the engine and/or of the vehicle. A signal, which represents the intake manifold pressure ps, is supplied via a first input line 20 from a pressure sensor 22. A signal representing the throttle flap position wdk is supplied via an input line 24 from a position transducer 26. Furthermore, a signal representing the engine rpm Nmot is supplied via an input line 28 from a corresponding measurement device 30. Also, a signal is transmitted via an input line 32 from a camshaft position transducer 34 from which the position of the camshaft ° NW can be derived. Also, input lines 36 and 38 are provided via which the signals from respective temperature sensors 40 and 42 are supplied. These signals represent the engine temperature tmot and the intake temperature tans, respectively. Also, in a preferred embodiment, a further pressure sensor 44 is provided which supplies a signal representing the ambient pressure pu via an input line 46 to the control unit 10. The control unit 10 controls the control quantities of the engine via the output circuit 16 and, in this way, influences, for example, the fuel metering 48, the ignition angle 50 and the position of a throttle flap 52.

In dependence upon the input quantities, the control unit 10 controls at least the fuel quantity, which is to be injected, the ignition angle to be adjusted, and, if required, the air mass to be supplied. The control unit 10 performs the control via a program implemented in the computer 14. This control takes place on the basis of the relative fresh air charge in the combustion chamber.

Figure 2:
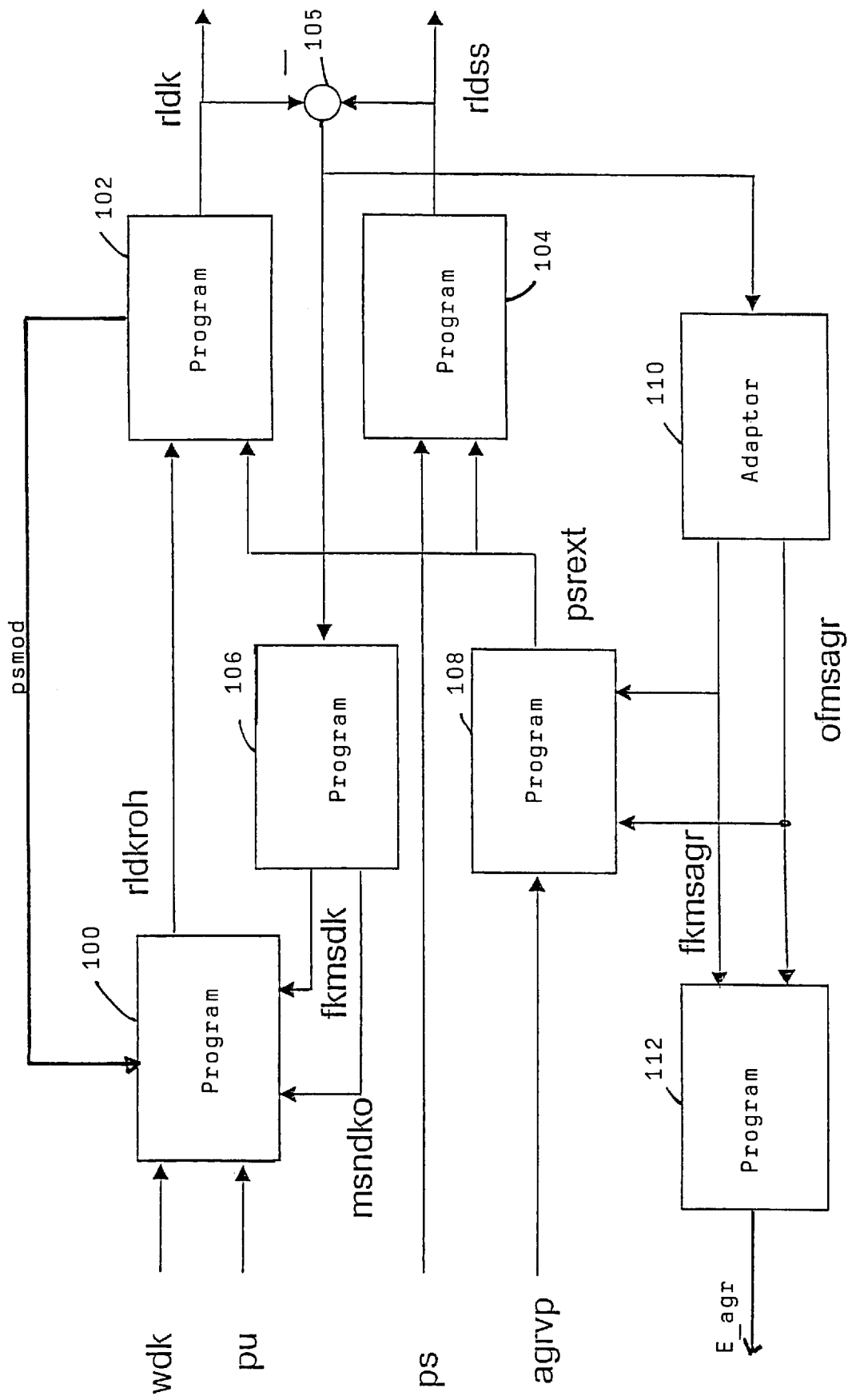
Figure 3:
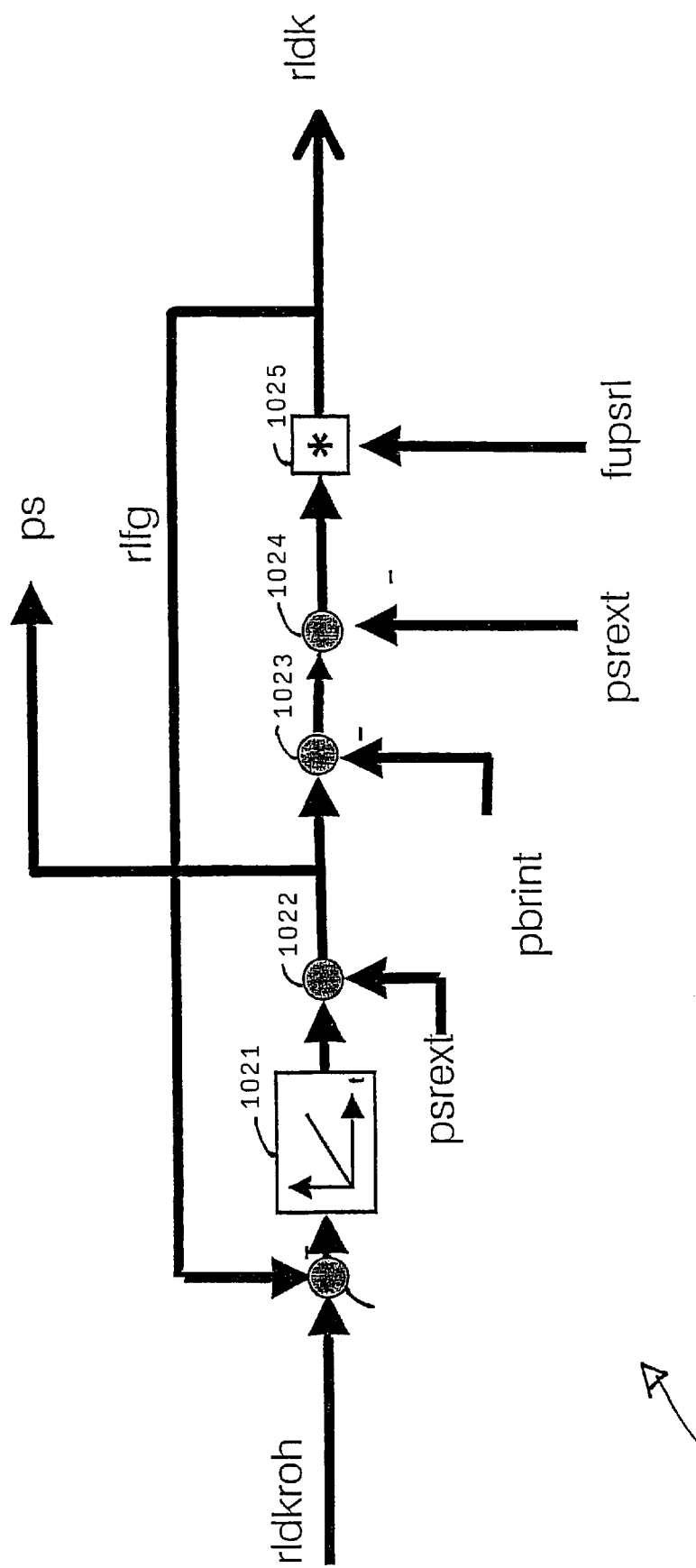
Figure 4:
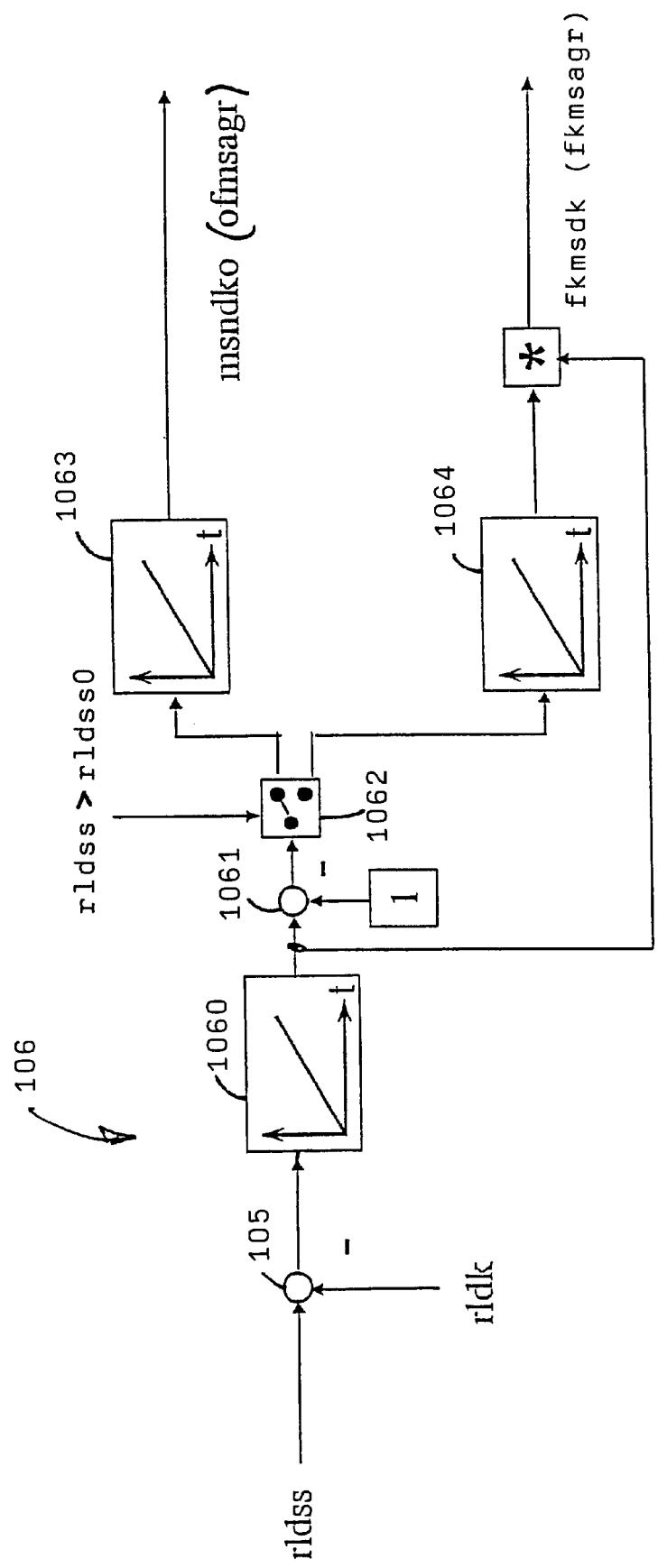

FIG. 2 shows a flowchart which illustrates the procedure of the charge detection and of the residual gas charge detection as well as the adaptation thereof. This residual gas includes, for example, that exhaust gas which is drawn back in when the cylinder valves open after a combustion, uncombusted air and the like. Depending upon the embodiment, both solutions are utilized together or only one of the solutions especially when there is no exhaust-gas recirculation system. The individual blocks of the flowchart of FIG. 2 as well as those of FIGS. 3 and 4 present programs, program parts or program steps which realize the described function and/or the procedure illustrated.

In the first program 100, the relative charge in the combustion chamber (inflow into the combustion chamber) is computed on the basis of the throttle flap position rldkroh. This takes place on the basis of the measured throttle flap angle wdk, the measured ambient pressure pu as well as a modeled intake manifold pressure signal psmod.

First, the air mass flow msdk is computed via the throttle flap in the program 100. The equation, which is used for the computation, is shown below and is essentially known from the state of the art referred to initially herein.

$$msdk = (msndk(wdk) + msndk0) * ftvdk * fpvdk * KLAF(psmod/pu) * fkmsdk \qquad (1)$$

wherein: msdk is the mass flow via the throttle flap; msndk is the mass flow via the throttle flap under standard conditions; wdk is the throttle flap angle; msndk0 is the adapted additive standard mass value; ftvdk is the root of the quotient of 273K divided by the intake air temperature; fpvdk is a pressure corrective factor; KLAF is the standardized outflow characteristic line of the throttle flap; pu is the pressure forward of the throttle flap which corresponds to the ambient pressure in a naturally aspirated engine; psmod is the modeled intake manifold pressure; and, fkmsdk is a multiplicative corrective factor for the mass flow via the throttle flap.

The mass flow msdk, which is computed in this way, is then converted by division with the rpm and a constant into the relative charge rldkroh in the combustion chamber. This quantity defines the inflow of external fresh air in the direction of the combustion chamber.

The corrective factors msndk0 and/or fkmsdk are adaptable and are determined via the adaptation of the charge, which is based on the throttle flap angle, and the charge which is based, on the intake manifold pressure sensor.

In the next program 102, the outflow from the intake manifold into the combustion chamber, which is delayed relative to the inflow into the combustion chamber, is computed from the charge signal rldkroh while modeling the dynamic performance of the intake manifold. The charge quantity, which represents the outflowing air charge from the intake manifold, is identified by rldk. The intake manifold pressure psmod is modeled in the intake manifold model 102 as an intermediate quantity which is made available in the program 100.

The intake manifold model is computed in program 102 and evaluates, in addition to the charge signal rldkroh, additionally the partial pressure psrext of an external exhaust-gas recirculation as well as the partial pressure of an internal exhaust-gas recirculation (not shown in FIG. 2), that is, the internal residual gas partial pressure pbrint.

As shown in FIG. 3, the inflow charge signal rldkroh is first compared to the model result rldk (actually outflowing fresh air charge flowing into the combustion chamber) in a logic element 1020. The deviation between the two values is integrated over time in an integrator 1021. This integrator simulates the storage performance of the intake manifold. The integrator then forms a quantity which represents the partial pressure of the fresh air charge in the intake manifold. The integrator forms this quantity based on the deviation between the inflowing fresh air charge and the fresh air charge drawn off by suction. The residual gas partial pressure of the external exhaust-gas recirculation psrext is added in the logic element 1022 to the integration result. The result defines the modulated intake manifold pressure psmod which is evaluated in program 100 to determine the inflowing fresh air charge. This total pressure psmod in the intake manifold is then, in order to determine the fresh air charge rldk drawn off by suction, reduced in the logic element 1023 by the internal residual gas component pbrint and in the logic element 1024 by the external residual gas component psrext. Thereafter, in the multiplication element 1025, the fresh air charge rldk, which flows into the cylinder, is computed by multiplication with the increase factor (conversion of pressure into charge).

This quantity is evaluated in the control of the engine in different ways, for example, by determining the actual torque.

In a further program 104, a corresponding signal for the fresh air charge is determined on the basis of the intake manifold pressure signal ps. Here, in addition to the measured intake manifold pressure ps, the partial pressure pbrint as well as the partial pressure psrext are computed. The partial pressure pbrint is caused by the internal residual gas and the partial pressure psrext is caused by the external residual gas. The relative air charge rldss in the combustion chanter is computed from the pressure sensor signal ps, for example, in accordance with the following formula:

$$rldss = (ps - pbrint - psrext) * fupsrl \quad (2)$$

wherein: ps is the intake manifold pressure measured with the intake manifold pressure sensor; pbrint is the partial pressure caused by the internal residual gas; pbsrext is the partial pressure caused by the external residual gas; and, fupsrl is a factor for the conversion of the pressure into a charge quantity which is used also in the intake manifold model 102. The result is the relative air charge rldss in the combustion chamber computed from the pressure sensor signal.

In order to adapt the two air charge signals to each other and especially to adapt the air charge signal, which is based upon the throttle flap angle and is burdened with inaccuracies, to the more precise air charge signal, which is based on the intake manifold pressure, additive and/or multiplicative adaptation factors are determined in program 106. As mentioned above, these adaptation factors are used in program 100 in the determination of the inflowing air charge. Here, the deviation between the two charge signals rldk and rldss is formed in the logic element 105 and is supplied to the program 106 to determine the corrective factors. This program forms two corrective factors from the charge, which is based on the deviation of the throttle flap angle, and the charge, which is based on the intake manifold pressure. These two corrective factors are for the offset and/or for the increase of the throttle flap characteristic line and are used in the computation of the in-flowing air charge. This adaptation is only active when the exhaust-gas recirculation valve is closed. If the air charge, which is based on the throttle flap angle (in another embodiment, the intake manifold pressure based charge signal), is greater than a pregiven threshold, then the multiplicative factor (increase factor) fkmsdk is shifted. Below the threshold, the offset factor msndk0, that is, the additive corrective term, is changed. In one embodiment, only one of the factors 4 computed.

If no ambient pressure sensor is present, then the ambient pressure pu is estimated on the basis of the multiplicative factors fkmsdk and the standard quantity 1013 hPa. Here, a filtering of the multiplicative factors is preferably utilized which generates a plausible smooth trace of the ambient pressure. The ambient pressure pu then contains, however, the multiplicative errors of the throttle flap system. The pu-signal again functions to determine the mass flow via the throttle flap in program 100.

A specific procedure for the adaptation in the program 106 is outlined in FIG. 4 based on a further flowchart. The deviation between the charge, which is based on the intake manifold pressure, and the charge, which is based on the throttle flap angle, is integrated over time in integrator 1060. The integration result is then subtracted from the value 1 in the logic element 1061 and is either supplied via a switching element 1062 to the integrator 1063 or to the integrator 1364. The switching element 1062 is switched over into a position (not shown) when the charge rldss, which is based on the intake manifold pressure, is greater than a pregiven threshold value (in another embodiment, the charge, which is based on the throttle flap angle). If the charge is less than the threshold value, then the integrator 1063 forms an additive corrective factor msndk0. In the other switch position of the switch element 1062, the output of the integrator 1064 multiplied by the output of integrator 1060 forms the corrective factor of a multiplicative type fkmsdk. With these corrective factors, the air charge signal, which is based on the throttle flap angle, is adapted to the air charge signal based on the intake manifold pressure. The adaptation is only active when the exhaust-gas recirculation is inactive and the exhaust-gas recirculation valve is closed.

In program 108, the partial pressure, which is caused by external residual gas in the combustion chamber, is computed on the basis of the position of the exhaust-gas recirculation valve agrvp. The corresponding procedure is known from the state of the art. The mass flow through the exhaust-gas recirculation valve is computed from the following formula:

$$msagr = (msnagr(agrvp) + ofmsagr) * ftagr * fpa * KLAF(ps/pa) * fkmsagr \quad (3)$$

wherein:
msagr is the mass flow through the EGR valve;
msnagr is the mass flow through the EGR valve under standard conditions;;
agrvp is the EGR valve position;
ofmsagr is the adapted additive corrective factor;
ftagr is a temperature factor;

fpa is the pressure factor;

pa is the pressure forward of the EGR valve;

KLAF is the standardized outflow characteristic line;

ps is the intake manifold pressure; and, fkrmsagr is the multiplicative corrective factor.

From the above, the exhaust-gas recirculation partial pressure psrext is computed by considering the engine rpm, a constant factor K and a conversion factor f:

$$psrext=f*msagr/(nmot*K) \quad (4)$$

In the determination of the exhaust-gas recirculation air mass flow, corrective factors ofmsagr (additive) and fkmsagr (multiplicative) are used and with the aid of these factors, the computation of the residual gas partial pressure is adaptable. The basis of the adaptation is likewise the deviation between the charge signal, which is based on the throttle flap angle, and the charge signal, which is based on the intake manifold pressure. These signals are supplied to the adaptor 110. This adaptor is active for active exhaust-gas recirculation. The program corresponds in its structure to the illustration of FIG. 4. The corrective factor ofmsagr is determined as the additive corrective factor and the factor fkmsagr is determined as a multiplicative factor.

Furthermore, at least one of the adaptation signals is used for the computation of the external residual gas partial pressure for monitoring the exhaust-gas recirculation system. For this purpose, a program 112 is provided which evaluates the multiplicative and/or additive corrective factors. A fault signal E_egr is set by the program when the multiplicative corrective factor and/or the additive corrective factor exceeds at least a pregiven threshold value, especially if these factors lie outside of a pregiven band which is determined by pregiven minimum and maximum values.

An impermissible change in the intake manifold pressure signal leads to setting of the fault signal E_egr for the described solution for detecting load. The same applies to a leakage in the intake manifold which causes an error in the charge computation and therefore, without an active lambda control, causes a mixture error which is corrected in the next phase without active exhaust-gas recirculation by the adaptation of the charge signals.

Depending upon the embodiment, the adaptation of the charge computation, the adaptation of the partial pressure computation, the determination of the ambient pressure and the monitoring of the exhaust-gas system can be used individually or in any desired combination. They define solutions independent from each other.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine having an intake manifold and a throttle flap and to which a fresh air charge is supplied during operation thereof, the method comprising the steps of:
   determining the angle of said throttle flap and forming a first signal indicative of the air charge associated with said angle;
   determining the intake manifold pressure and forming a second signal indicative of the air charge associated with said intake manifold pressure; and,
   adapting said first signal to said second signal utilizing at least one corrective factor.

2. The method of claim 1, wherein at least one of the following is provided as said corrective factor: an offset corrective factor and an increase corrective factor.

3. The method of claim 2, comprising the further step of forming said corrective factor only when there is no active exhaust-gas recirculation.

4. The method of claim 1, comprising the further step of carrying out the adaptation in dependence upon the deviation between said first and second signals.

5. A method for operating an internal combustion engine having an intake manifold and a throttle flap and to which a fresh air charge is supplied during operation thereof, the method comprising the steps of:
   determining the angle of said throttle flap and forming a first signal indicative of the air charge associated with said angle;
   determining the intake manifold pressure and forming a second signal indicative of the air charge associated with said intake manifold pressure;
   providing an exhaust-gas recirculation having an exhaust-gas recirculation valve and computing the mass flow or partial pressure in dependence upon the position of said valve;
   determining a deviation between said first and second signals; and,
   correcting the computation of said mass flow or partial pressure in dependence upon said deviation between said first and second signals.

6. The method of claim 5, comprising the further steps of:
   checking a corrective factor with respect to threshold values and determining if a fault is indicated; and,
   making the correction of said computation with said corrective factor when said threshold values are exceeded.

7. The method of claim 5, comprising the further step of deriving the ambient air pressure from a multiplicative adaptation factor for the charge computation based on the throttle flap angle.

8. An arrangement for operating an internal combustion engine having an intake manifold and a throttle flap and to which a fresh air charge is supplied during operation thereof, the arrangement comprising:
   a control apparatus including:
      means for determining the angle of said throttle flap and forming a first signal indicative of the air charge associated with said angle;
      means for determining the intake manifold pressure and forming a second signal indicative of the air charge associated with said intake manifold pressure; and,
      means for adapting said first signal to said second signal utilizing at least one corrective factor.

9. An arrangement for operating an internal combustion engine having an intake manifold and a throttle flap and to which a fresh air charge is supplied during operation thereof, the arrangement comprising:
   a control apparatus including:
      means for determining the angle of said throttle flap and for forming a first signal indicative of the air charge associated with said angle; means for determining the intake manifold pressure and for forming a second signal indicative of the air charge associated with said intake manifold pressure; means for providing an exhaust-gas recirculation having an exhaust-gas recirculation valve and computing the mass flow or partial pressure in dependence upon the position of said valve;

means for determining a deviation between said first and second signals; and, means for correcting the computation of said mass flow or partial pressure in dependence upon said deviation between said first and second signals.

10. A computer program comprising: program-code means for carrying out a method for operating an internal combustion engine having an intake manifold and a throttle flap and to which a fresh air charge is supplied during operation thereof, the method including the steps of:

determining the angle of said throttle flap and forming a first signal indicative of the air charge associated with said angle;

determining the intake manifold pressure and forming a second signal indicative of the air charge associated with said intake manifold pressure; and, adapting said first signal to said second signal utilizing at least one corrective factor.

11. A computer program product comprising:

program-code means which are stored on a computer readable data carrier in order to carrying out a method for operating an internal combustion engine having an intake manifold and a throttle flap and to which a fresh air charge is supplied during operation thereof, the method including the steps of:

determining the angle of said throttle flap and forming a first signal Indicative of the air charge associated with said angle;

determining the intake manifold pressure and forming a second signal indicative of the air charge associated with said intake manifold pressure; and, adapting said first signal to said second signal utilizing at least one corrective factor.

* * * * *